March 28, 1961     H. GUTTON     2,977,589
ELECTROMAGNETIC DETECTING AND TRACKING DEVICES
Filed Sept. 12, 1955     2 Sheets-Sheet 1

INVENTOR
HENRI GUTTON
BY Paul M. Craig, Jr.
ATTORNEY.

United States Patent Office 2,977,589
Patented Mar. 28, 1961

2,977,589

ELECTROMAGNETIC DETECTING AND TRACKING DEVICES

Henri Gutton, Paris, France, assignor to Compagnie Generale de Telegraphie Sans Fil, a corporation of France Filed Sept. 12, 1955, Ser. No. 533,820

Claims priority, application France Sept. 18, 1954

1 Claim. (Cl. 343—17.1)

The present invention relates to electromagnetic systems of the radar type used for detecting and tracking mobile targets.

The radar according to the invention is essentially a pulse transmitter-receiver device. It is based on the possibility of synchronizing a pulse train emitted by a self-oscillator with a signal of very low amplitude emitted by a master-oscillator, this synchronisation taking place as soon as the conditions of maintenance of oscillation of the self-oscillator are satisfied.

The radar, according to the invention, is equipped for producing two pulse trains. The first train is formed by short and comparatively powerful recurrent pulses, the carrier frequency of which is synchronized with that of a pilot oscillator in permanent operation. The pulses of the second train are longer and less powerful than the pulses of the first train, and they are inserted between the first train pulses. In the absence of echoes, the second train pulses scan regularly, with respect to time, the time interval comprised between two pulses of the first train: the delay between a pulse of the first train and a pulse of the second train is at first equal to the recurrence period T of the first pulse train. It then decreases regularly at each period, until it drops to zero and then returns again suddenly to T. It may be said that the second pulse train undergoes a pulse position modulation of a given pattern. However, when the moment of the reception of the echo signal corresponding to the first train pulse coincides with the moment when a second train pulse is produced, the carrier frequency of said second train pulse is synchronised by the echo signal i.e. its frequency becomes identical with the frequency of the echo signal. Now, because of the well known Doppler effect, this latter frequency is a function of the velocity of the echo-producing mobile target.

According to the invention, there is derived from the frequency of the pulse which has been synchronised in the above way a voltage which is proportional to the velocity of the mobile target. The action of this voltage is then substituted for the action of the means which, in pulse modulating the second pulse train in the absence of the echo, cause the pulses of the second train to scan regularly, and according to a saw-tooth pattern, the interval between two pulses of the first train. In other words, the lag of a second train pulse with respect to a first train pulse, which it immediately follows, becomes a function of the distance between the radar and the mobile target.

The invention will be better understood from the ensuing description taken with reference to the appended drawings wherein.

It must be emphasized that all the circuit elements described, considered as such, are well known in the art. Accordingly, they will be shown by means of blocks only and will not be described individually in detail. Moreover, the same references have been used to designate like elements in all figures.

Figure 1:
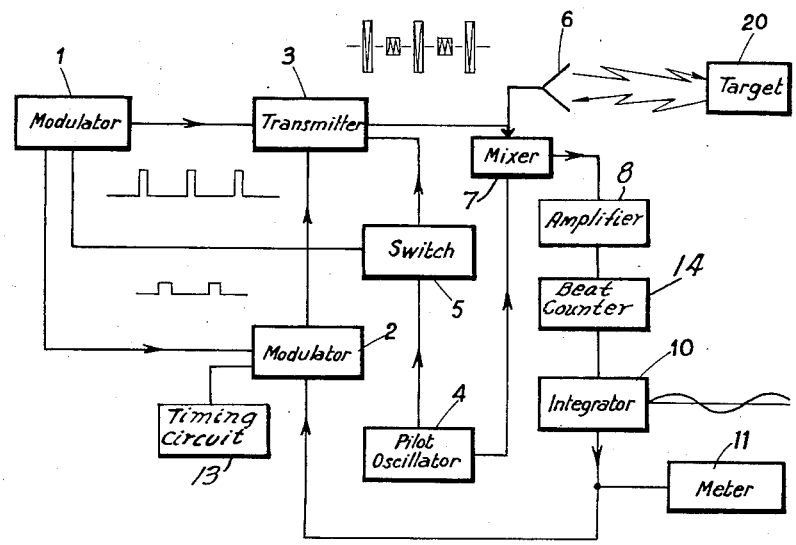
Figure 1 is a block diagram of a system according to the invention, the form of the output voltages of the various stages being shown at the corresponding points.

According to the embodiment shown in Fig. 1, which is limited to distance tracking, the self-oscillating transmitter 3 is pulse modulated by the two modulators 1 and 2. It will therefore emit two high frequency trains, each pulse being built up by an ultra-high frequency wave train. The first train obtained by means of modulator 1 is the only one to be formed by pulses of sufficiently high power to provide radiation in space. It is formed of pulses having a repetition frequency F and a period $T=1/F$. The second pulse train, obtained by means of a conventional timing circuit 13, driving a modulator 2, is formed of extremely weak pulses, which are advantageously longer than the first train pulses.

Figure 2:
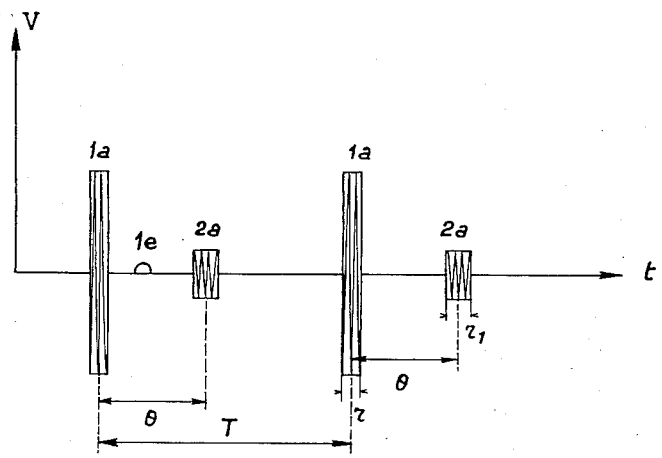
Fig. 2 shows diagrammatically the two pulse trains.

As already indicated, and as shown in Fig. 2, the pulses $2a$ of the second train are inserted between pulses $1a$ of the first train. In Fig. 2 the time $t$ has been plotted on the abscissa, and the amplitude V of the pulses on the ordinate. Modulator 2 comprises a circuit of a well known position modulating type. It makes it possible to cause the time lag between the pulses $1a$ and the pulses $2a$ following them respectively to be regularly varied, in a linear way with respect to time, i.e. to cause each second train pulse to scan the time interval comprised between two first train pulses. Thus the interval $\theta$, comprised between pulse $1a$ and the pulse $2a$ which follows, varies regularly, when no echo is received, between T and zero and then suddenly returns to T. To this end, a circuit such as the circuit described under the name of "phantastron" in "Wave Forms," vol. 19, Radiation Laboratory Series of M.I.T., may be used.

Transmitter 3 is synchronized with a pilot oscillator 4 of very low power. A switch 5 is provided between oscillator 4 and transmitter 3. This switch operates at the frequency of modulator 1, so that synchronization with oscillator 4 takes place only during the first train pulses. Consequently, the second train pulses are not synchronized by pilot 4.

Transmitter 3 is connected to a transmitting-receiving aerial 6. Further a mixer 7 has one of its inputs loosely coupled to transmitter 3 and it is connected to oscillator 4 by another input.

The output of mixer 7 is connected to an amplifier 8 the pass-band of which is comprised, for reasons which will be apparent later on, between two frequencies, respectively equal to the beat frequencies between the frequency of pilot-oscillator 4 and the limit frequencies reflected by the mobile target on reception of the signals from transmitter 3 i.e. between the Doppler frequencies respectively corresponding to the limit velocities of the mobile target i.e. the highest velocity and the lowest velocity 20 for which it is desired to track the latter, the above mentioned limit frequencies being the two Doppler frequencies respectively corresponding to said highest velocity and said lowest velocity. The output of amplifier 8 is connected to a beat counting device 14. This beat counting device counts the beats amplified by amplifier 8 during a fixed time interval. As a consequence of the Doppler effect, the signal manifested by this counter is a measure of the radial velocity of target 20, relating to aerial 6. An integrating circuit 10 receives the output signal of the counting device 14 and provides at its output a voltage which is a measure of the distance travelled by the target after pulses $2a$ and $1e$ coincide. This voltage is used to control modulator 2 as mentioned above, thus insuring a continuous tracking of target 20 by causing pulses 2a and 1e to coincide. The device according to the invention operates as follows:

(1) No echo, obtained under the Doppler effect, is received by aerial 6:

In this case, pulse signals 1a (Fig. 2) are regularly transmitted and, as already mentioned, are the only ones to be radiated.

These signals are mixed in mixer 7 with those of pilot oscillator 4. As the frequency of the wave trains forming the pulses 1a is synchronized with the frequency of the signals emitted by this oscillator, a voltage having a zero frequency beat, i.e. a D.C. voltage, is obtained at the output of mixer 7. Accordingly, this voltage is not passed through amplifier 8. As to the beat of the pulses 2a with the signal transmitted by oscillator 4, it simply results in noise.

(2) The signals transmitted by aerial 6 impinge on a target moving toward the aerial 6 and echoes are sent back by said target:

Pulse 1a, having for instance a carrier frequency of 1,000,000 kc./s., is emitted by aerial 6 and strikes mobile target 20. As already mentioned, owing to the Doppler effect, it is as if the target were to emit an echo signal 1e having for example a carrier frequency of 1,000,001 kc./s. and received $2d/300000$ seconds after the transmission of signal 1a, where $d$ is the distance in kilometers between aerial 6 and the target.

A pulse 2a is transmitted after a time $\theta$ following each pulse 1a, time $\theta$ varying regularly between T and O, T being proportional to the radar range, it may be stated that while pulse 2a scans the time interval T, it also scans a distance comprised between $d$ maximum and zero.

Signal 1e also scans a portion of interval T, this portion diminishing as the mobile target 20 is approaching the aerial 6. It is clear that, if the scanning velocity is made more rapid for signal 2a than for signal 1e, signal 2a will overtake signal 1e while scanning period T.

Mixing oscillations 2a with the oscillation of oscillator 4 in mixer 7 will result in a current having a frequency $F_3$ equal to 1 kc. in the example under consideration i.e. to Doppler frequency which is proportional to the velocity of the target 20. A sinusoidal voltage having the frequency $F_3$ is thus obtained at the output of mixer 7, this voltage being amplified by amplifier 8. This voltage is used to provide a measure of the distance $d$ between the aerial 6 and the target 20, and also, as will be described later with reference to Fig. 3, to determine the azimuth and the bearing of the target.

In order to determine $d$, the beats giving the Doppler frequency are integrated in the integrator 10. At the output of the latter a voltage is collected which is proportional, at each instant, to the distance covered by target 20 radially with respect to antenna 20. In order to have the distance $d$ continuously manifested by the meter 11 the output voltage of the integrator 10 is applied to the pulse position modulator 2 as explained above.

One of the main advantages of the invention is the possibility of using the same self-oscillator both for transmission and for reception, and thus avoiding the transmission-reception switching device of conventional radars. The receiver itself becomes extremely simple, everything happening as though the echo received were, in fact, considerably amplified while synchronizing the pulses 2a.

Another advantage consists in that the radar is sensitive only to the echoes reflected back by mobile targets, the stationary echoes being without action, as shown above. Moreover, as the oscillation 2a may be synchronized only at the beginning of each of these oscillations, a great accuracy is obtained, the pulse 2a having a limited duration i.e. a limited length in space.

It is clear that the device so far described can be used to give the distance between the mobile target and the aerial 6 only if the target reflecting back the echoes is situated in the radiation lobe of aerial 6.

It is known that the two angular coordinates of an obstacle, considered as a point, with respect to a trihedral of reference, for instance the azimuth of the bearing of the target, are defined by an angle $\psi$ in respect to the origin of the trihedral of reference and that this angle is connected by the following relation to the difference $\varphi$ between the phases of a signal reflected by the obstacle and respectively received at two points spaced apart by D:

$$\sin \psi = \frac{\lambda \varphi}{2\pi D}$$

where $\lambda$ is the wavelength of the carrier wave.

The measure of the phase difference $\varphi$ is effected by known means, such as a phasemeter for instance. It is also known that the phase difference between the beats due to the Doppler effect, and received by two receivers, is identical to that existing between the ultra-high frequency oscillations.

In order to determine the direction of an echo, i.e. ensure the tracking of a target according to a given azimuth or a given bearing, two arrangements of the type represented in Fig. 1 are provided, said arrangements having their respective aerials 6 placed at a distance D from one another.

Figure 3:
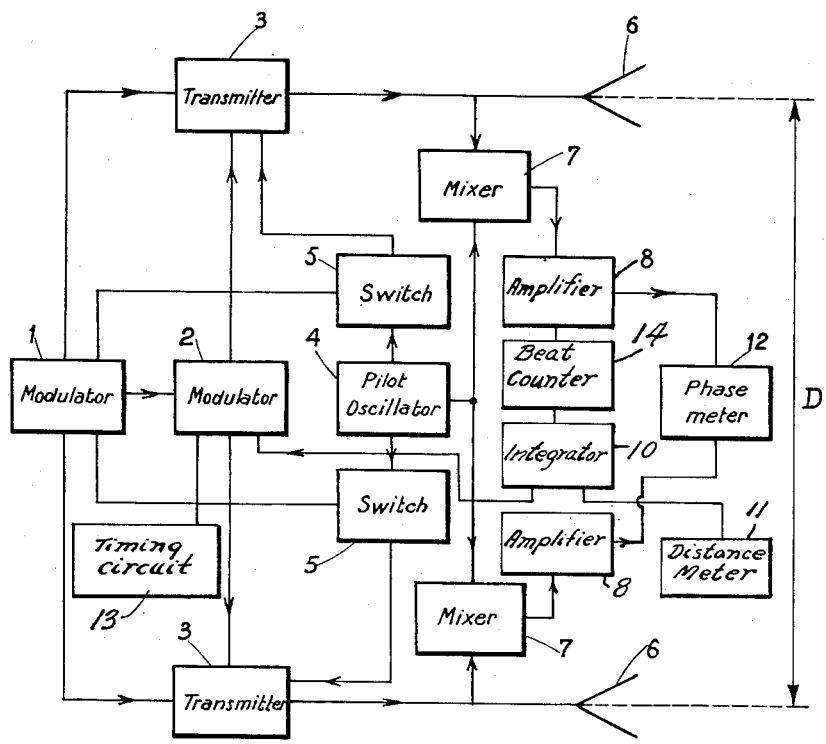
Figure 3 is a block diagram of another embodiment of the system according to the invention.

The block diagram of such system is shown in Fig. 3. The two arrangements may be combined and have common modulators 1 and 2 and a pilot 4. The low frequency sinusoidal voltage obtained at the output of one of the amplifiers 8 ensures the tracking in distance as described above. Further, the phase difference between the output voltages of the two amplifiers 8 is measured by a phase meter 12 whose output voltage is used to keep the desired direction.

Two other systems similar to the system of Fig. 3 provide the bearing of the target, the three coordinates of which i.e. distance, azimuth and bearing thus determined.

For a better appraisal of the invention, a few numerical values are given hereinafter, by way of example:

Duration of first train pulses=$0.2 \times 10^{-6}$ seconds
Duration of second train pulses=$2 \times 10^{-6}$ seconds
$T=10^{-3}$ seconds ($F=10^3$ c./s.)

Power of pilot $4=10^{-8}$ watts
Peak power of pulse $1a=1$ watt
Frequency of carrier wave $f=500$ mc./s. ($=0.60$ m.)

The frequency of the output control voltage of stage 8 (resulting from the frequency variation due to the Doppler effect) is:

$$f_d = 2\frac{V_r}{c}f$$

where $c$ is the velocity of light, $V_r$ the radial velocity of the target, the radius considered being the straight line joining the target to the device.

Thus, with the preceding values:
$$F_d = 3.4 V_r \text{ (m./sec.)}$$
When $V_r=10\theta$ m./sec., or 360 km./hour, $f_d=340$ c./s.

Supposing that the lowest frequency passed by the selective amplifier 8 is $f_1=100$, all mobile targets the radial velocity of which is lower than about 105 km./hour are thus eliminated.

What I claim is:

A radar system comprising: an auto-oscillator for transmitting a signal having a given frequency; means for pulse modulating said signal with a predetermined repetition frequency thereby to provide first pulses; means for pulse modulating said signal with the same repetition frequency thereby to provide second pulses and for progressively and recurrently position modulating said second pulses with respect to said first pulses; a master oscillator having a predetermined frequency; switching means for connecting, during the transmission of said first pulses, said master oscillator to said auto-oscillator for synchronizing the carrier frequency of said first pulses;

means connected for radiating said first pulses, for receiving echo signals produced by the reflection of said pulses on a target and for synchronizing with their carrier frequency the carrier frequency of said second pulses; mixing means for mixing the output signals of said master oscillator and said second pulses for providing the beat therebetween; and means for filtering and integrating said beats thereby to provide a voltage proportional to the integral of the relative radial velocity with respect to said receiving means.

References Cited in the file of this patent

UNITED STATES PATENTS

| | | |
|---|---|---|
| 2,476,409 | Free | July 19, 1949 |
| 2,532,221 | Bradley | Nov. 28, 1950 |